(12) United States Patent
Candela et al.

(10) Patent No.: US 8,342,452 B2
(45) Date of Patent: Jan. 1, 2013

(54) STRUCTURAL ELEMENT FOR COVERING AN ELONGATE GAP ON AN AERODYNAMIC SURFACE OF AN AIRCRAFT

(75) Inventors: Franco Candela, Alpignano (IT); Giuseppe Migliozzi, Turin (IT)

(73) Assignee: Alenia Aeronautica S.p.A., Pomigliano D'Arco, Napoli (IT)

( * ) Notice: Subject to any disclaimer, the term of this patent is extended or adjusted under 35 U.S.C. 154(b) by 697 days.

(21) Appl. No.: 12/504,458

(22) Filed: Jul. 16, 2009

(65) Prior Publication Data

US 2010/0096504 A1 Apr. 22, 2010

(30) Foreign Application Priority Data

Jul. 16, 2008 (IT) .................................. TO08A0545

(51) Int. Cl.
*B64C 1/38* (2006.01)
(52) U.S. Cl. ........................................ 244/130; 244/213
(58) Field of Classification Search .................. 244/130, 244/131, 211–217; 296/178, 180.1
See application file for complete search history.

(56) References Cited

U.S. PATENT DOCUMENTS

| | | | | |
|---|---|---|---|---|
| 2,915,948 A | * | 12/1959 | Fehring ........................ | 89/37.16 |
| 3,184,186 A | * | 5/1965 | Ikai et al. ...................... | 244/213 |
| 4,120,470 A | * | 10/1978 | Whitener ...................... | 244/213 |
| 4,705,236 A | * | 11/1987 | Rudolph ...................... | 244/90 R |
| 4,784,355 A | * | 11/1988 | Brine ........................... | 244/213 |
| 5,222,692 A | * | 6/1993 | Glowacki ..................... | 244/53 R |
| 5,372,336 A | * | 12/1994 | Paez ............................. | 244/49 |
| 5,598,990 A | * | 2/1997 | Farokhi et al. .............. | 244/200.1 |
| 5,735,485 A | * | 4/1998 | Ciprian et al. ................ | 244/113 |
| 6,086,146 A | * | 7/2000 | Nabuurs ........................ | 296/217 |
| 6,447,050 B1 | * | 9/2002 | Plassmeyer et al. ........ | 296/180.5 |
| 6,877,695 B2 | * | 4/2005 | Eveker et al. .............. | 244/129.5 |
| 6,981,676 B2 | * | 1/2006 | Milliere ........................ | 244/213 |
| 7,669,800 B2 | * | 3/2010 | Martin Hernandez ........ | 244/130 |
| 7,708,231 B2 | * | 5/2010 | Lacy et al. ..................... | 244/211 |
| 7,815,147 B2 | * | 10/2010 | Martin Hernandez ........ | 244/130 |
| 7,909,290 B2 | * | 3/2011 | Cooper .......................... | 244/132 |
| 2003/0230677 A1 | * | 12/2003 | Milliere ........................ | 244/213 |
| 2005/0061922 A1 | * | 3/2005 | Milliere ........................ | 244/213 |
| 2006/0006286 A1 | * | 1/2006 | Eveker et al. .............. | 244/129.5 |
| 2006/0145012 A1 | * | 7/2006 | Hernandez ..................... | 244/130 |
| 2006/0249627 A1 | * | 11/2006 | Martin Hernandez ........ | 244/130 |
| 2008/0029647 A1 | * | 2/2008 | Hernandez ..................... | 244/130 |
| 2008/0121758 A1 | * | 5/2008 | Hernandez ..................... | 244/130 |

FOREIGN PATENT DOCUMENTS

DE 22 16 710 A1 10/1973

* cited by examiner

*Primary Examiner* — Joseph W Sanderson
(74) *Attorney, Agent, or Firm* — Merchant & Gould P.C.

(57) ABSTRACT

A covering structural element is adapted to close an elongate gap provided on an aerodynamic surface of an aircraft. Such an element has a strip-shaped body made of metal material, including a fixing portion, adapted to be fixed along one of the longitudinal borders of the elongate gap; a sliding portion adapted to urge in a sliding manner on the other of the longitudinal borders of the strip-shaped gap; and a connection portion, connecting the sliding portion to the fixing portion, the thickness of which is so sized as to allow, in use, a controlled elastic bending of the structural covering element. The covering structural element has a profile so sized as to be tapered at the transition from the fixing portion to the connection portion and from the sliding portion to the connection portion, the covering structural element having a smooth surface on the side intended to face away from the elongate gap.

4 Claims, 2 Drawing Sheets

Figure 1:
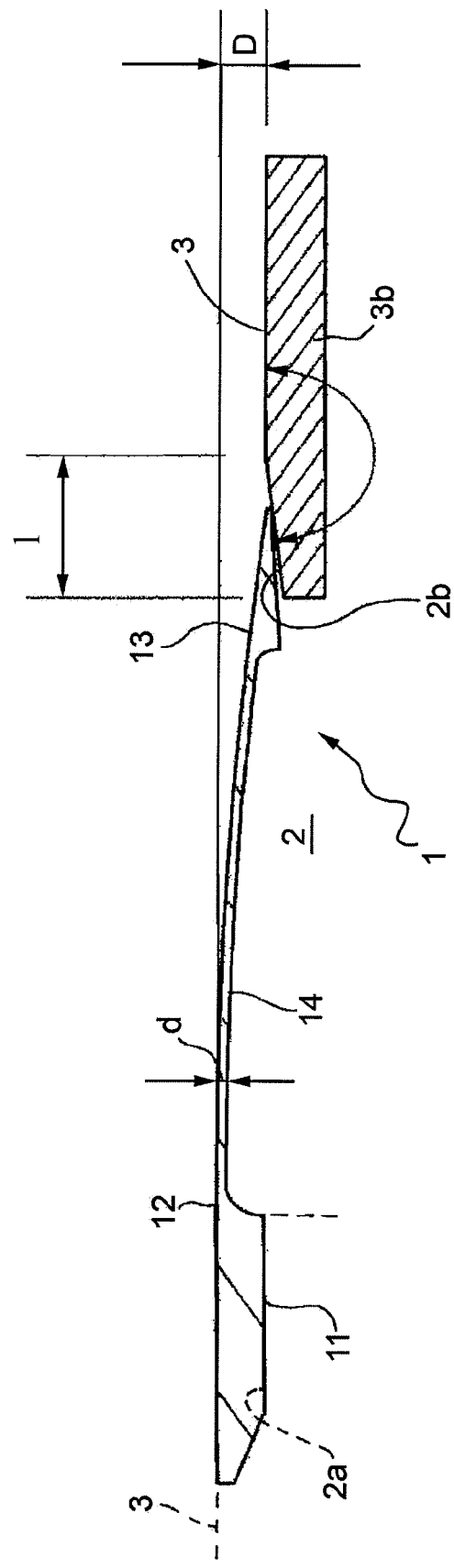

STRUCTURAL ELEMENT FOR COVERING AN ELONGATE GAP ON AN AERODYNAMIC SURFACE OF AN AIRCRAFT

This application claims benefit of Italian application Ser. No. T2008A00054, filed Jul. 16, 2008, and which application is incorporated herein by reference. To the extent appropriate, a claim of priority is made to the above disclosed application.

The present invention refers to a covering structural element adapted to close an elongate gap provided on an aerodynamic surface of an aircraft.

In the building of aircraft, both civil and military, the gaps, left because of a design choice or due to assembly needs, create problems connected to the aerodynamic aspects of the aircraft, and therefore they must be "blocked out".

Moreover, in particular in the new generation of military aircraft, with and without pilot, there is also a need for low radar detectability.

Current technology is based upon the use of gaskets made of conductive elastomer, which are designed according to the following guidelines:

1) it is necessary to define and develop a "strong" structure that is able to withstand the stresses due to flying loads;

2) it is necessary to design, size and use a conductive rubber to ensure the conductive contact between the surfaces so as to avoid both aerodynamic problems and radio frequency scattering problems, linked to the presence of gaps, and therefore of surface discontinuities.

In complying with these aspects, in general different types of technical problems arise linked to the assembly, i.e. to the coordination of the different elements, to wear, i.e. to the fact that the elastomer, subjected to cycle testing, naturally loses the contact surface and therefore needs to be restored and replaced, and to weight, i.e. to the fact that each individual element brings its own characteristics and increases the weight.

All of this results in very stringent functional and maintenance requirements that are often incompatible with the required operative requirements.

In view of such a problem, therefore, the object of the invention is a covering structural element of the type defined in the preamble, which consists of a strip-shaped body made of metal material, comprising a fixing portion provided along one edge of the strip-shaped body, said fixing portion being adapted to be fixed along one of the longitudinal borders of the elongate gap;

a sliding portion provided along the edge of the strip-shaped body opposite with respect to the one of the fixing portion, said sliding portion having a wedge-shaped profile and being adapted to urge in a sliding manner on the other of the longitudinal borders of the elongate gap; and a connection portion, connecting the sliding portion to the fixing portion, the thickness of said connection portion being so sized as to allow, in use, a controlled elastic bending of the structural covering element;

wherein the covering structural element has a profile so sized as to be tapered at the transition from the fixing portion to the connection portion and from the sliding portion to the connection portion, said covering structural element having a smooth surface on the side intended to face away from the elongate gap.

The structural element according to the invention is able to comply both with the mechanical-structural requirements linked to the containment of the flight loads, and to the aerodynamic characteristics, and those determined by low radar detectability, for which it is necessary to avoid or minimise the possible different types of surface discontinuities of the aircraft due to the presence of steps, slits, and more generally installation gaps.

The invention also relates to an aerodynamic surface of an aircraft, providing an elongate gap, said elongate gap being closed by a covering structural element according to the invention.

Figure 2:
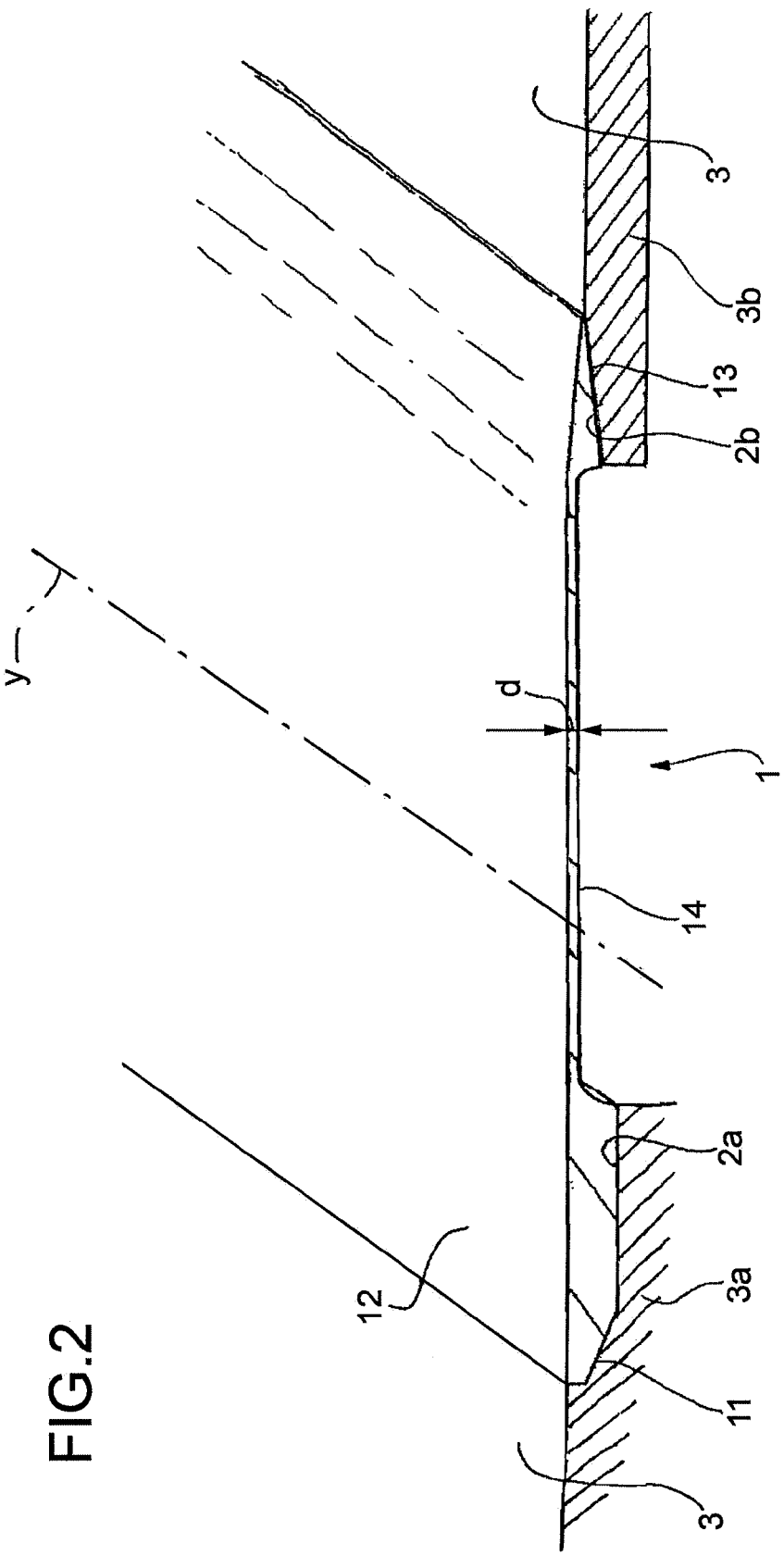

A preferred but not limiting embodiment of the invention will now be described, with reference to the attached drawings, in which:

FIG. 1 is a cross section view of a covering structural element according to the invention; and FIG. 2 is a perspective view of the structural element of FIG. 1 in section, in installed condition.

With reference to the figures, there is shown a covering structural element 1 adapted to close an elongate gap 2 provided on an aerodynamic surface 3 of an aircraft. Such an elongate gap thus locally separates two structural parts, designated at 3a and 3b in the figures, which cooperate to define the aerodynamic surface 3 of the aircraft. In FIG. 2, the letter y indicates the axis of extension of the elongate gap 2.

The covering structural element 1 consists of a strip-shaped body made of magnetic metal material. The choice of a metal material that is also magnetic advantageously allows the piece to be fixed to the magnetic bench of a numerical control machine, so as to obtain minimum machining thicknesses necessary to gain the desired flexibility (see later).

The element 1 could also be produced with other processing methods, for example hot bending, although machining is currently preferable for cost reasons.

The element 1 comprises a fixing portion 11 provided along one edge of the strip-shaped body of the structural element 1. Such a fixing portion 11 is adapted to be fixed along one of the longitudinal borders 2a of the elongate gap 2 (which hereafter will be indicated as fixing border). Provided along such a longitudinal fixing border 2a is a seat for fixing the structural element 1, which is shaped in a complementary manner with respect to the fixing portion 11, so that the outer surface 12 of the structural element 1 forms a continuous surface with the aerodynamic surface 3 at the longitudinal fixing border 2a. The fixing of the structural element to the longitudinal border 2a of the gap 2 is carried out through conventional means, for example through bolting, welding or gluing, and it can be removable or permanent.

The structural element 1 also comprises a sliding portion 13 provided along the edge of the strip-shaped body of the structural element opposite with respect to the one of the fixing portion 11. The sliding portion 13 has a wedge-shaped profile and is adapted to urge in a sliding manner on the other, 2b, of the longitudinal borders of the strip-shaped gap 2 (which hereafter will be indicated as sliding border). In particular, the aforementioned sliding portion 13 is in contact with a ramp surface provided at the longitudinal sliding border 2b. Such contact is maintained even in the case of limited relative movements between the two structural parts 3a and 3b of the aerodynamic surface 3, due to the movement along the loading directrix of the sliding portion 13 of the structural element 1. Moreover, the thickness profile of the sliding portion 13 is numerically optimised to minimise the electromagnetic scattering due to the transition between the structural element 1 and the aerodynamic surface 3. The wedge-shaped profile of the sliding portion 13 is thus calculated in a way that depends upon the angle a that the ramp surface of the longitudinal fixing border 2b defines with respect to the adjacent part of the aerodynamic surface 3, and upon the transverse extension b of such a ramp surface, so as to reduce to the minimum the scattering effects produced by the configuration in question in the various foreseen design positions of the sliding portion with respect to the longitudinal sliding border 2b.

The covering structural element 1 finally comprises a connection portion 14 that connects the sliding portion 11 to the fixing portion 13. The thickness d of such a connection portion 14 is sized so as to allow, in use, a controlled elastic bending (in the transverse plane) of the covering structural element 1, as illustrated in FIG. 2 (FIG. 1, on the other hand, represents the structural element 1 in undeformed state). The connection portion 14 thus determines the rigidity of the system; in particular, it allows the variation in the local curvature profile of the outer surface 12 of the element 1 to be controlled and minimised, so as to ensure a negligible contribution to the radar impinge section with respect to the requirements for current aircraft.

The covering structural element 1 has a profile so sized as to be tapered at the transition from the fixing portion 11 to the connection portion 14 and from the sliding portion 13 to the connection portion 14. In particular, the connection portion 14 has a thickness d substantially constant along its entire transverse extension, and smaller than the maximum thickness of both the fixing portion 11 and the sliding portion 13. Moreover, the transition from the fixing portion 11 to the connection portion 14 and from the sliding portion 13 to the connection portion 14 is substantially configured to form a step (with a joint to avoid an excessive concentration of mechanical tensions). The structural element 1 does however have a smooth overall surface (i.e. the outer surface 12) on the side intended to face away from the elongate gap 2.

As can be seen in FIG. 2, the covering structural element 1 is devised as an elastic element capable to maintaining contact between the two parts 3a and 3b of the aerodynamic surface 3 through a preload obtained thanks to the relative positioning of such parts. The deformation of the element 1 is displayed in the figures: in FIG. 1 (undeformed condition) the upper surface of the fixing portion 11 of the structural element 1 and the upper surface of the structural part 3b are represented so as to have a difference in level D; in FIG. 2 (installed condition) such a difference in level is, however, almost absent, due to the bending caused by the relative positioning of the two parts 3a and 3b of the aerodynamic surface 3.

The structural element 1 according to the invention must necessarily be "tailored" based on the parts to be "joined", and with regard to their structural behaviour, thus lending themselves to be used on both fixed and mobile assemblies. The essential elements of the invention are in any case maintained irrespective of the specific application.

The main advantages of the invention are the following:
- adaptability to step variations (i.e. variations in the difference in level of the two structural parts at the sides of the gap) and gap variations (i.e. variations in the width of the gap), i.e. flexibility of installation; the assembled parts do not necessarily have to be serialised;
- adjustment to the contact surface;
- ease of disassembly and reassembly (should the closing element be fixed removably);
- maintaining the electrical contact between the parts;
- lightness;
- minimisation of the problems of radio frequency scattering, and therefore natural use in designs in which very low radar detectability is required;
- no particular maintenance.

What is claimed is:

1. An aerodynamic surface of an aircraft, providing an elongate gap having a first longitudinal border and a second longitudinal border opposite the first longitudinal border, said elongate gap being closed by a covering structural element, wherein the covering structural element comprises a strip-shaped metal body comprising:
   a fixing portion provided along one edge of the strip-shaped body, said fixing portion of the covering structural element being fixed along one of the longitudinal borders of the elongate gap;
   a sliding portion provided along an edge of the strip-shaped body opposite the fixing portion, said sliding portion having a wedge-shaped profile urging in a sliding manner on a ramp surface of the second longitudinal border of the elongate gap;
   a connection portion connecting the sliding portion to the fixing portion, the connection portion having a thickness substantially constant along an entire transverse extension and smaller than a maximum thickness of the fixing portion and a maximum thickness of the sliding portion to allow in use, controlled elastic bending of the structural covering element;
   wherein the covering structural element has a profile tapered at a transition from the fixing portion to the connection portion and from the sliding portion to the connection portion, said covering structural element having a smooth surface on a side facing away from the elongate gap; and
   wherein said covering structural element is installed in a preloaded manner, the preloaded manner being such that the sliding portion fully engages the ramp surface, the connection portion of the covering structural element being subjected to flexural stress due to the relative positioning of the longitudinal borders of the elongate gap.

2. An aircraft surface according to claim 1, wherein provided along the longitudinal border of the elongate gap is a seat for fixing the covering structural element, said seat being shaped in a complementary manner with respect to the fixing portion, in such a manner that said smooth surface of the covering structural element forms a continuous surface with the aerodynamic surface at the longitudinal border corresponding to the fixing portion.

3. An aerodynamic surface according to claim 1, wherein a transition from the fixing portion to the connection portion and from the sliding portion to the connection portion is substantially configured to form a filleted step.

4. An aerodynamic surface according to claim 1, wherein said strip-shaped metal body comprises a magnetic body metal material.

* * * * *